US009681765B2

(12) United States Patent
Cignarella

(10) Patent No.: US 9,681,765 B2
(45) Date of Patent: Jun. 20, 2017

(54) INTERACTIVE CHILDREN'S TABLE DISHES

(71) Applicant: Pamela Ann Cignarella, Hull, MA (US)

(72) Inventor: Pamela Ann Cignarella, Hull, MA (US)

( * ) Notice: Subject to any disclaimer, the term of this patent is extended or adjusted under 35 U.S.C. 154(b) by 1 day.

(21) Appl. No.: 14/855,420

(22) Filed: Sep. 16, 2015

(65) Prior Publication Data

US 2016/0088958 A1    Mar. 31, 2016

Related U.S. Application Data

(60) Provisional application No. 62/057,572, filed on Sep. 30, 2014.

(51) Int. Cl.
*A63H 33/00* (2006.01)
*A47G 19/02* (2006.01)
*A63H 5/00* (2006.01)
*A63H 33/22* (2006.01)
*A63H 33/26* (2006.01)
*A63H 33/30* (2006.01)

(52) U.S. Cl.
CPC ............ *A47G 19/025* (2013.01); *A63H 5/00* (2013.01); *A63H 33/00* (2013.01); *A63H 33/22* (2013.01); *A63H 33/26* (2013.01); *A63H 33/30* (2013.01); *A47G 2200/08* (2013.01); *A47G 2200/143* (2013.01)

(58) Field of Classification Search
CPC ........ A63H 33/00; A63H 33/16; A63H 3/003; A63H 3/005; A47G 19/065; A47G 19/2283; A47G 19/26; A45C 15/06; B65F 1/163; B65F 1/08; F21Y 2101/02
See application file for complete search history.

(56) References Cited

U.S. PATENT DOCUMENTS

| | | | | |
|---|---|---|---|---|
| D77,298 S | * | 12/1928 | Del Vilbiss | D7/551.3 |
| D77,302 S | * | 12/1928 | Del Vilbiss | D7/551.3 |
| D94,833 S | * | 3/1935 | Herring | 294/172 |
| D98,071 S | * | 1/1936 | Karsh | D7/551.3 |
| 2,156,351 A | * | 5/1939 | Paul | A47G 19/2227 40/324 |
| 2,178,812 A | * | 11/1939 | Schade | A47G 19/025 126/246 |
| D121,516 S | * | 7/1940 | Le Guillou | D7/551.3 |
| D139,349 S | * | 11/1944 | Rothbardt | D7/506 |
| D146,405 S | * | 2/1947 | Bundy | D7/539 |
| D148,012 S | * | 12/1947 | Falk | D11/158 |
| 2,453,922 A | * | 11/1948 | Manaster | A63H 3/24 446/304 |
| 2,455,266 A | * | 11/1948 | Nudelman | A63H 33/00 446/304 |

(Continued)

*Primary Examiner* — Aarti B Berdichevsky
*Assistant Examiner* — Urszula M Cegielnik
(74) *Attorney, Agent, or Firm* — Law Offices of Daniel A. Tesler, LLC

(57) ABSTRACT

An apparatus for encouraging children to eat meals through the use of interactive lights and audio is provided. In one embodiment is a bowl with lights embedded on its outer surface, capable of being illuminated by a controller in various lighting sequences. Also included is an audio speaker capable of reproducing audio stored in an internal controller. In other embodiments are a tray and dishes that use light and audio adapted for their specific application.

15 Claims, 11 Drawing Sheets

(56) References Cited

U.S. PATENT DOCUMENTS

| | | | | |
|---|---|---|---|---|
| D159,643 S | * | 8/1950 | Kelly et al. | D30/129 |
| D164,551 S | * | 9/1951 | Connell, Jr. | D7/551.3 |
| 2,681,656 A | * | 6/1954 | Starkenberg | A24F 19/09 131/236 |
| 3,202,423 A | * | 8/1965 | Becker | A63H 33/00 446/479 |
| D227,139 S | * | 6/1973 | Niven | D30/129 |
| 3,791,550 A | * | 2/1974 | Duncan | A47G 19/025 206/457 |
| 3,839,793 A | * | 10/1974 | Crapio | A47G 21/02 30/123 |
| 4,803,604 A | * | 2/1989 | Nichols | A47G 23/06 362/154 |
| 4,863,033 A | * | 9/1989 | Buj | A47G 21/02 206/457 |
| 5,269,717 A | * | 12/1993 | Tardif | A47G 19/025 206/457 |
| 5,355,289 A | * | 10/1994 | Krenn | A47G 23/06 362/154 |
| 5,509,844 A | * | 4/1996 | Poirier | A63H 33/04 108/25 |
| 5,712,004 A | * | 1/1998 | Lin | B65D 25/20 428/33 |
| 5,823,329 A | * | 10/1998 | Roberts | A47G 19/02 206/216 |
| 6,021,941 A | * | 2/2000 | Schultz | A63H 33/42 229/103 |
| 6,116,455 A | * | 9/2000 | Rossman | B65D 81/365 220/23.83 |
| 6,152,575 A | * | 11/2000 | Montanino | A47G 23/06 362/154 |
| 6,165,038 A | * | 12/2000 | Muller | A63H 3/008 446/219 |
| 6,273,421 B1 | * | 8/2001 | Thalheimer | A63H 33/00 273/161 |
| 6,296,540 B1 | * | 10/2001 | LaPlaca | A63H 23/00 446/75 |
| D452,636 S | * | 1/2002 | Hill | D7/547 |
| 6,352,258 B1 | * | 3/2002 | Fitzgerald | A63H 33/42 273/138.1 |
| 6,443,796 B1 | * | 9/2002 | Shackelford | A63H 33/042 273/237 |
| D468,966 S | * | 1/2003 | Shareef | D7/505 |
| 6,505,734 B2 | * | 1/2003 | Su | A47G 19/2227 206/217 |
| 6,743,071 B1 | * | 6/2004 | Tronca | A63H 33/00 206/541 |
| 6,793,362 B2 | * | 9/2004 | Tai | A47G 19/2227 362/101 |
| 7,163,311 B2 | * | 1/2007 | Kramer | A47G 19/025 220/574 |
| 7,354,331 B2 | * | 4/2008 | Sala | A47G 19/025 446/130 |
| 7,367,145 B2 | * | 5/2008 | Mou | G09F 13/00 215/379 |
| 8,833,583 B2 | * | 9/2014 | Blondeel | A47G 19/06 108/25 |
| 9,022,595 B1 | * | 5/2015 | Schilling | F21V 33/0028 362/154 |
| 2004/0245126 A1 | * | 12/2004 | Diatikar | B65F 1/02 206/223 |
| 2006/0158886 A1 | * | 7/2006 | Lee | A47G 19/025 362/318 |
| 2009/0321455 A1 | * | 12/2009 | Fernandez | A47G 19/025 220/574 |
| 2011/0034103 A1 | * | 2/2011 | Fong | A63H 3/28 446/297 |
| 2014/0104817 A1 | * | 4/2014 | Foo | A47G 23/0216 362/154 |

* cited by examiner

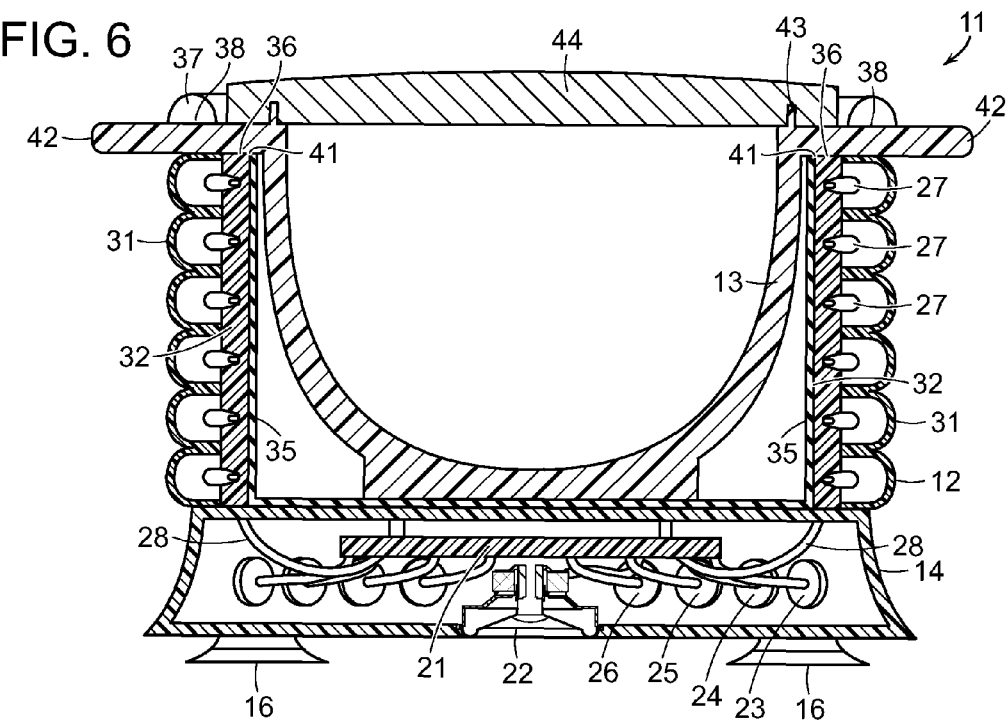
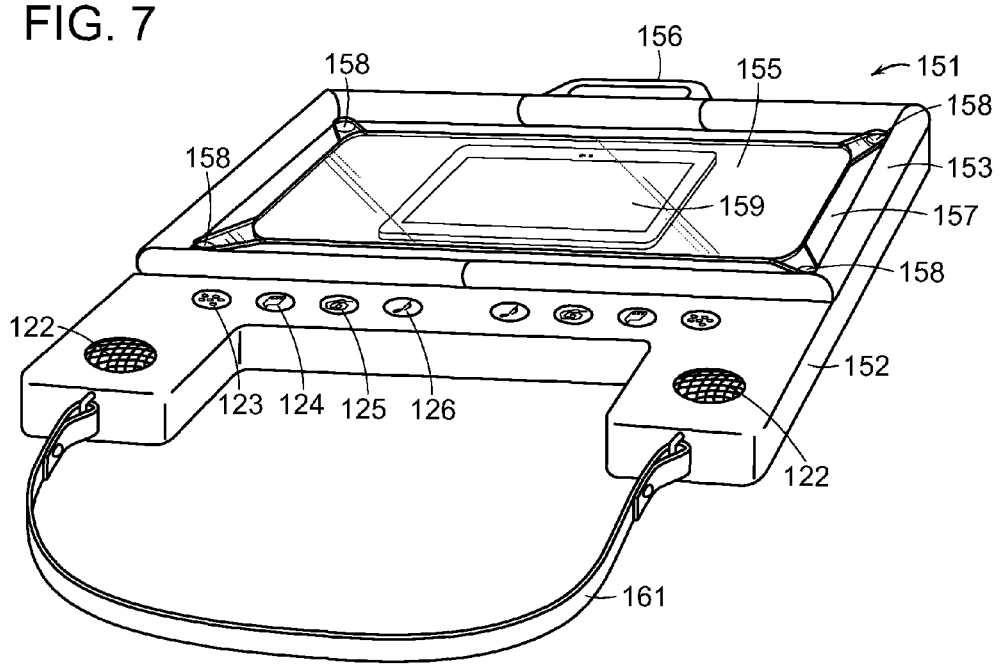

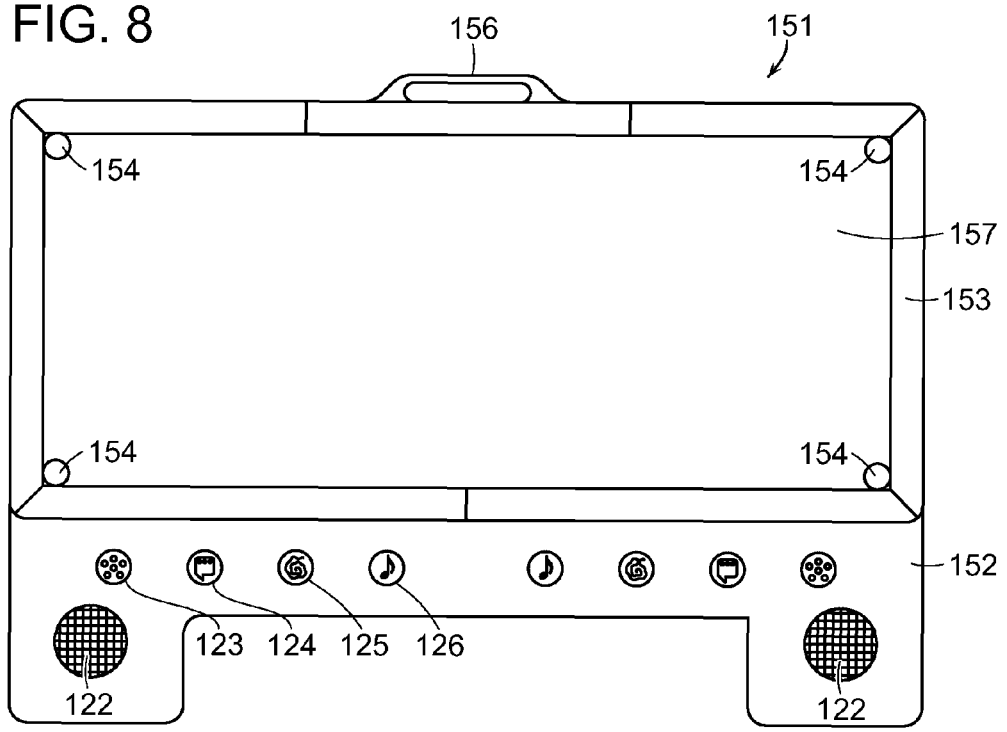
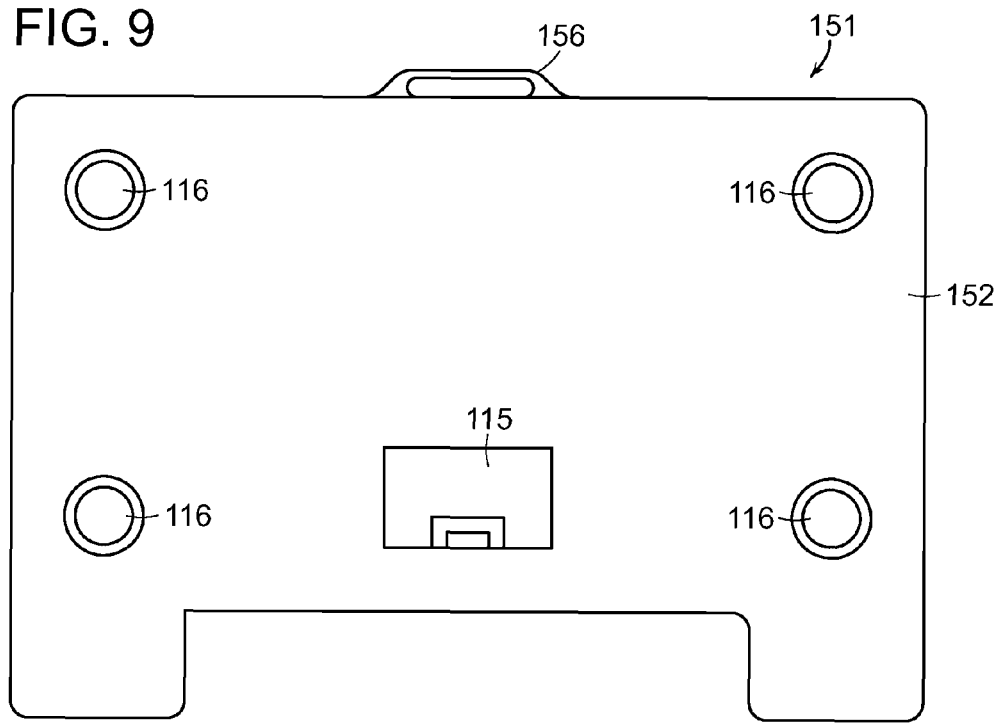

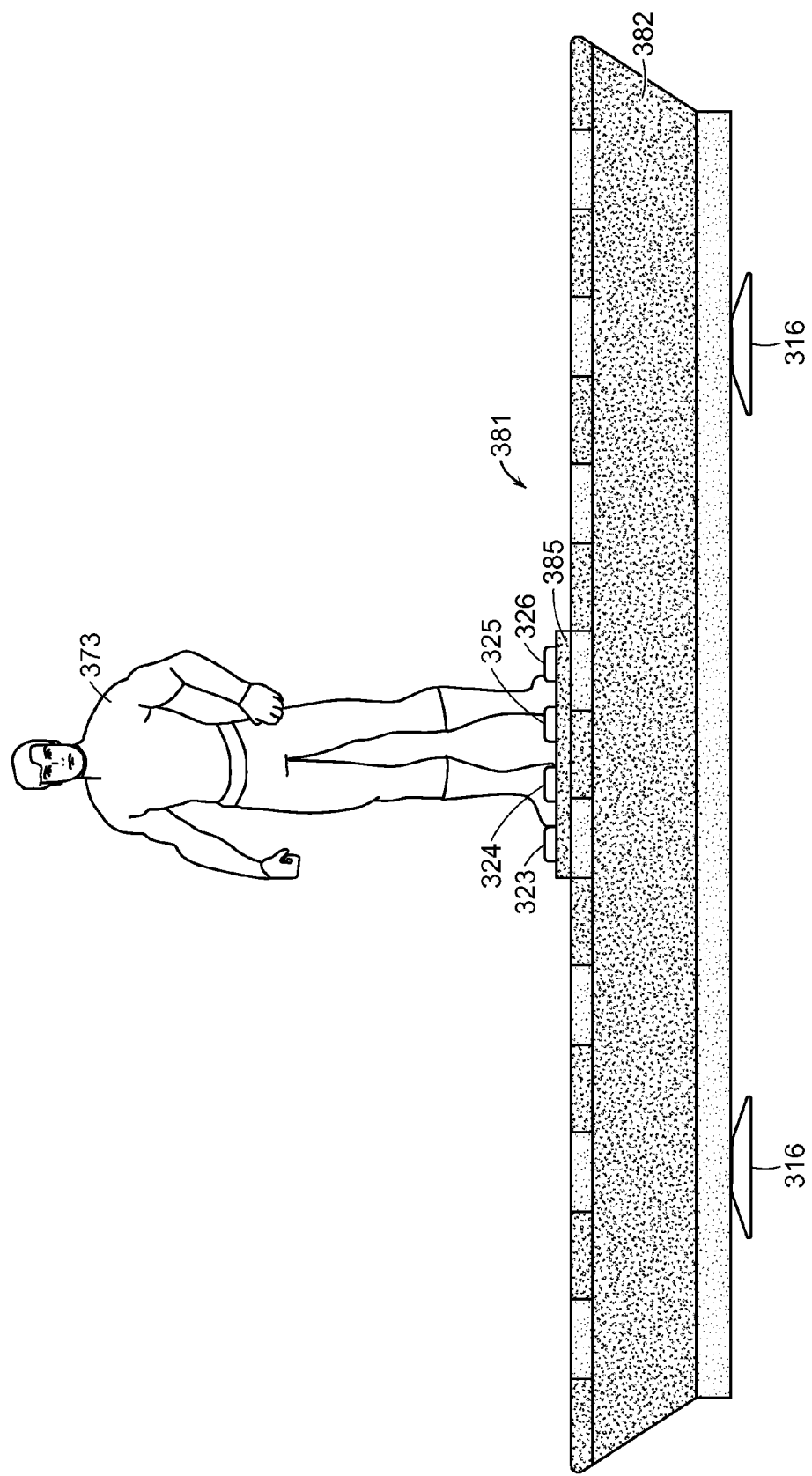

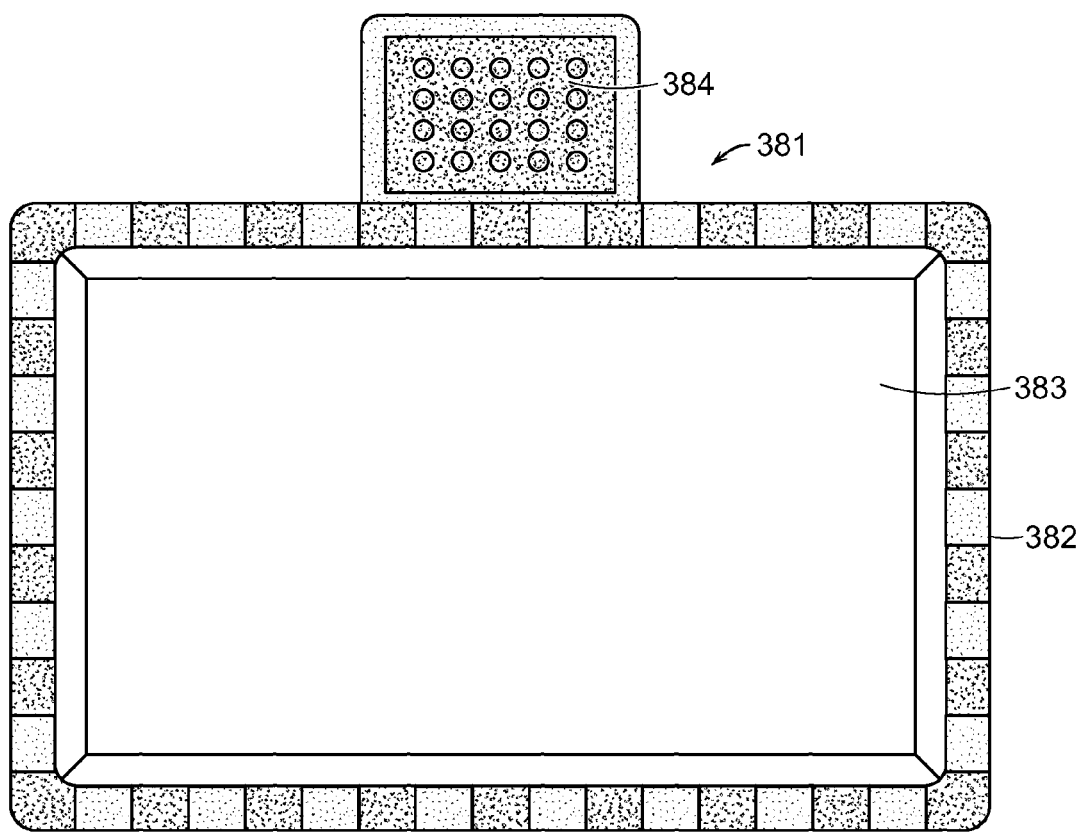

INTERACTIVE CHILDREN'S TABLE DISHES

CROSS REFERENCE TO RELATED APPLICATIONS

This application claims the benefit of U.S. Provisional Patent Application No. 62/057,572 filed Sep. 30, 2014, which is hereby incorporated by reference in its entirety.

FIELD OF THE INVENTION

The present invention relates to table dishes and, in particular, to table dishes for children.

BACKGROUND OF THE INVENTION

Over the years, various products have been devised for enticing children who are picky eaters to eat their meals. These products have been focused on the shape of the food generally or a peripheral toy and have not been completely effective at encouraging many children to eat.

One common product in use today is food in the shape of an animal or object to make the food visually more appealing to a child. Chicken nuggets and cookies have been successfully formed into shapes, but this type of treatment is not possible on all types of food. Specifically, this type of treatment is not possible on many vegetables and healthy foods that experts recommend that children consume. Therefore there is a need for an apparatus or method to encourage children to eat food that is not easily formed into shapes.

One common method of serving food is to give the child a small inexpensive toy with his or her meal. These toys are often designed to have a limited service life and are not intended to maintain a child's attention for more than a single meal. Therefore, there is a need for a method of serving food to children that uses a durable apparatus that can be reused for multiple meals.

The present invention provides a reusable apparatus to encourage children to eat meals that does not require the use of food designed in special shapes. To encourage children to eat, the present invention uses a series of buttons to actuate sounds and lights on a table dish designed to be pleasing to children. In an alternative embodiment, the present invention also provides a tray that can be attached to a high chair, car seat, etc. that incorporates lights and sounds. In an alternative embodiment, the present invention also provides a game dish that contains a low profile table dish with a removable toy figure and a vertical panel designed to hold a removable background image. In an alternative embodiment, the present invention also provides a toy tower dish containing a low profile table dish with a removably attached toy figure with buttons to actuate sounds and lights.

Accordingly, it is an object of the present invention to provide an improved table dish to encourage children to eat meals and a method of using the same.

BRIEF SUMMARY OF THE INVENTION

The present invention utilizes buttons to actuate lights and sounds integrated in a table dish or tray. The table dish or tray can optionally include a removable insert, removable vertical panel or a removable toy figure. The sounds used may include, but are not limited to music, sound effects, animal sounds, singing or speaking. The lights are built into the table dish or tray and are enclosed in translucent plastic of various colors. The lights can optionally be in a clear housing and use LED bulbs with different colors.

Each embodiment of the present invention is designed to both encourage children to eat and to provide a level of entertainment for the child. Some embodiments could be used outside of mealtimes to provide entertainment to the child.

In a first embodiment of the invention is a multicolored bowl with buttons actuating integrated lights and an integrated speaker and a removable inner bowl. The first embodiment is designed to appeal to children from approximately six months old to 18 months and older. All age ranges given are approximate. It is understood that each child develops differently and each embodiment of the invention may be appropriate for some children at a younger or older age than the given age range.

In a second embodiment of the invention is a portable tray with buttons actuating integrated lights and speakers with a removable cover to allow a tablet style computer to be used with the tray. The second embodiment is designed to appeal to children from approximately eight months old to two years and older.

In a third embodiment of the invention is a dish with a removable back section and figurine. The third embodiment is designed to appeal to children from approximately three years old to five years and older.

In a fourth embodiment of the invention is a dish with an integrated base that allows a toy figurine to be quickly mounted and removed. The toy figurine further includes buttons actuating integrated lights and an integrated speaker in the figurine. The fourth embodiment is designed to appeal to children from approximately 12 months old to three years and older.

BRIEF DESCRIPTION OF THE SEVERAL VIEWS OF THE DRAWINGS

FIG. 6 is a front sectioned view of a first embodiment of the invention with a cover installed over the bowl.

FIG. 7 is a perspective view of a second embodiment of the invention.

FIG. 8 is a top view of a second embodiment of the invention with the removable tablet cover removed.

FIG. 9 is a bottom view of a second embodiment of the invention.

FIG. 15 is a front view of a fourth embodiment of the invention with the figurine mounted.

FIG. 16 is a top view of a fourth embodiment of the invention without the figurine.

DETAILED DESCRIPTION OF THE INVENTION

Figure 1:
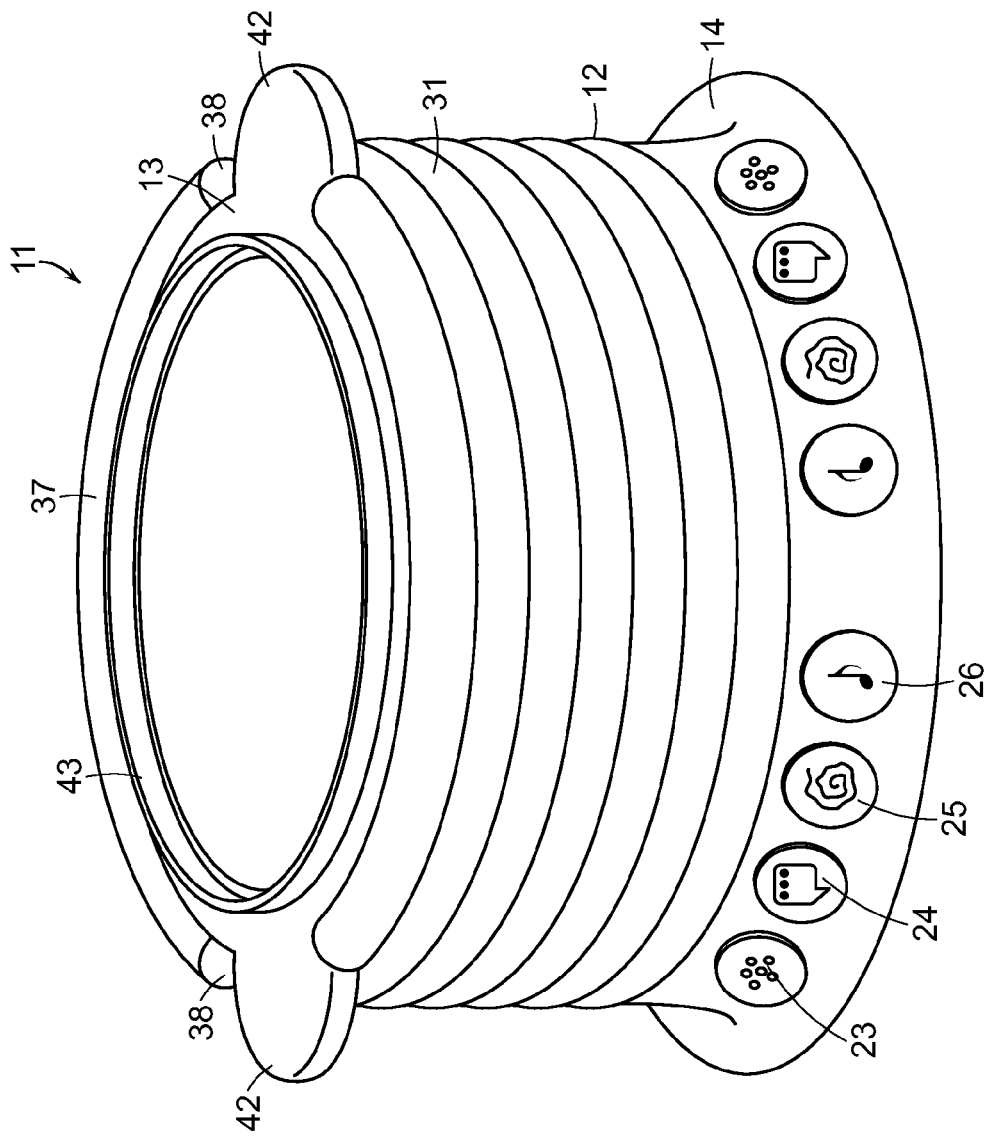
FIG. 1 is a perspective view of a first embodiment of the invention.

As seen in FIGS. 1-6 is an interactive bowl 11 with buttons actuating integrated lights and an integrated speaker. The interactive bowl is comprised of an outer bowl 12 containing the electronics (lights, speaker, buttons, controller, etc.) and a removable inner bowl 13.

The outer bowl has a hollow base 14 that contains the controller 21, the speaker 22 and the buttons 23-26 used to control the lights 27 and sounds produced by the speaker 22. The controller 21 comprises a common circuit board capable of processing a signal from one or more buttons 23-26 to actuate the integrated lights 27 and/or speaker 22. The buttons 23-26 are preferably of a water resistance design. One such water resistant design uses a conventional push button with a thin, clear plastic covering sealed against the housing, in this case, the hollow base 14. The base of the outer bowl 12 contains an access door 15 to allow the internally mounted batteries (not pictured) to be replaced. The base 14 also contains suction cups 16 to allow the bowl to be temporarily and positively mounted to a smooth surface.

Figure 2:
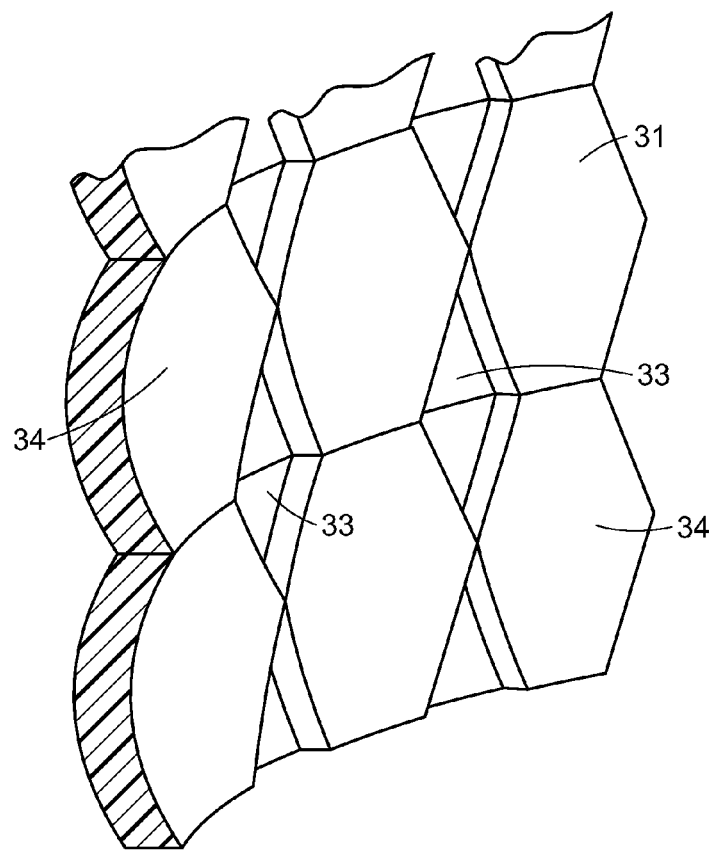
FIG. 2 is a sectioned perspective view of the translucent exterior used in a first embodiment of the invention.
Figure 3:
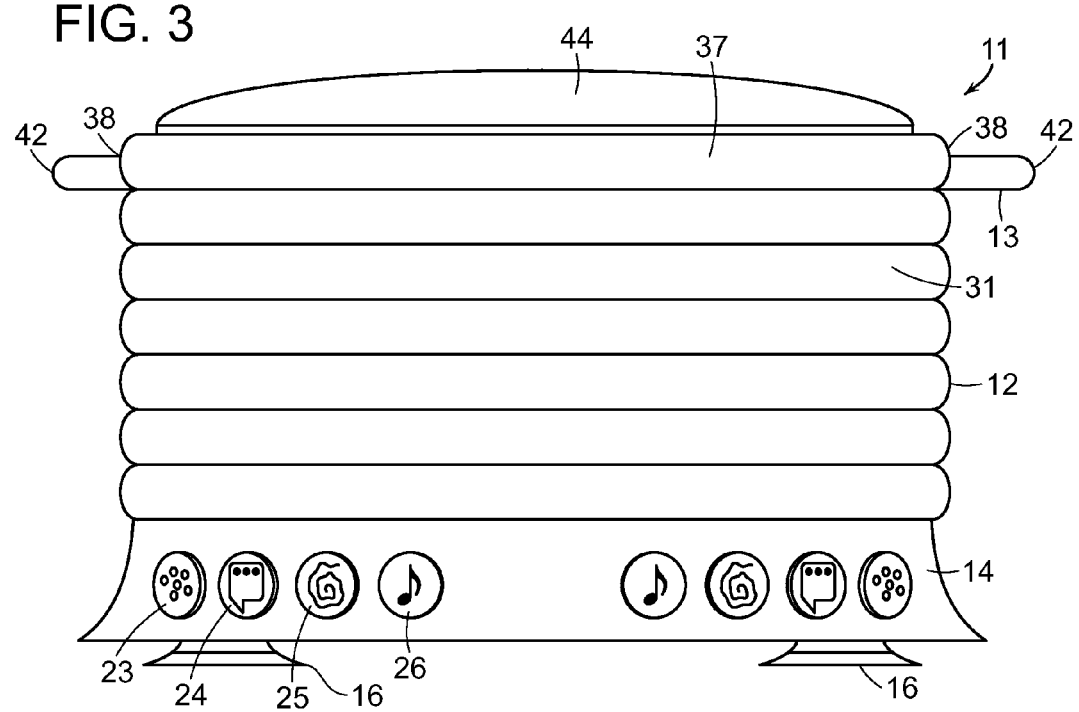
FIG. 3 is a front view of a first embodiment of the invention with a cover installed over the bowl.
Figure 4:
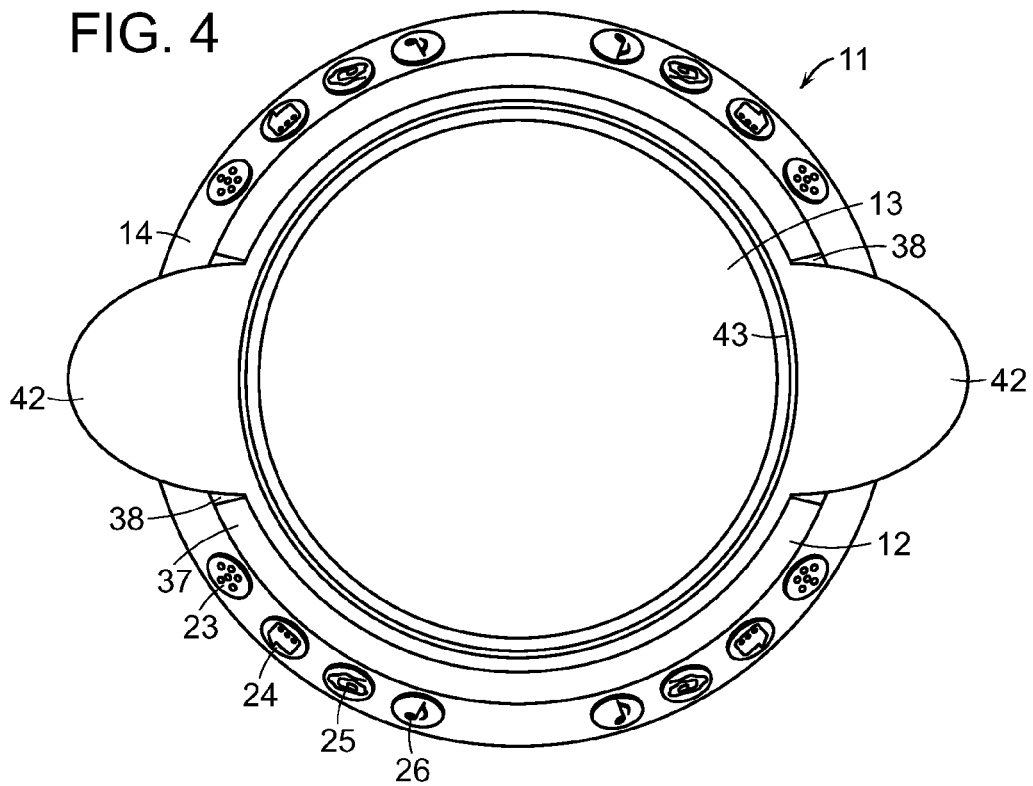
FIG. 4 is a top view of a first embodiment of the invention.
Figure 5:
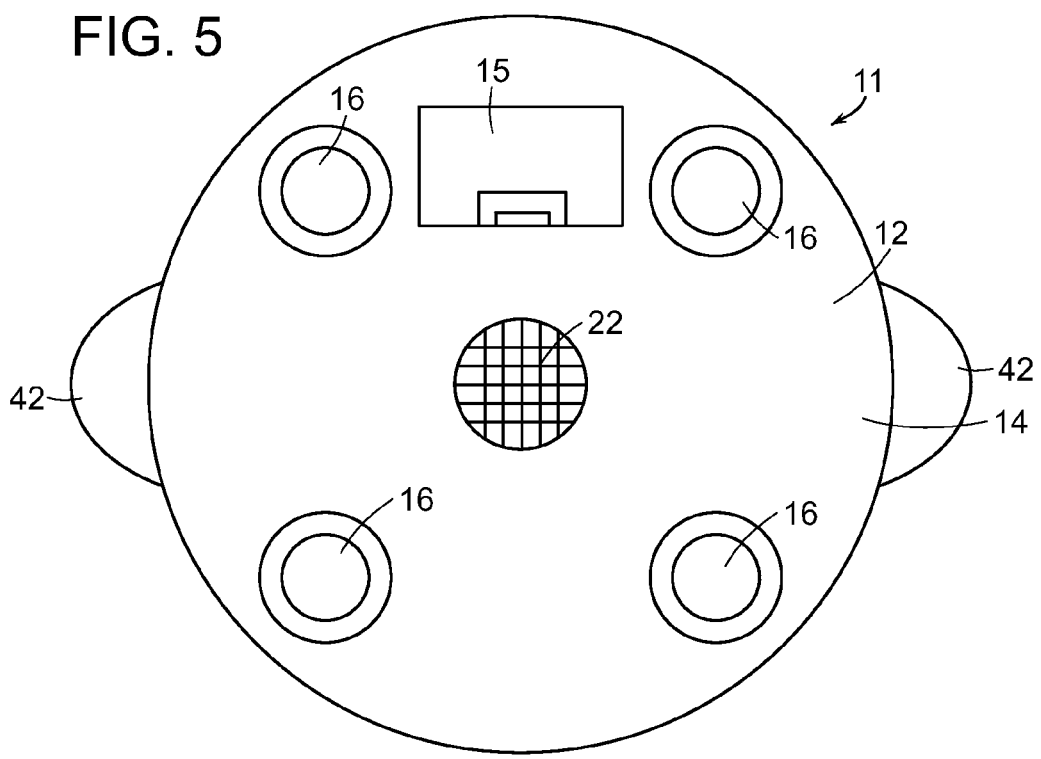
FIG. 5 is a bottom view of a first embodiment of the invention.
Figure 10:
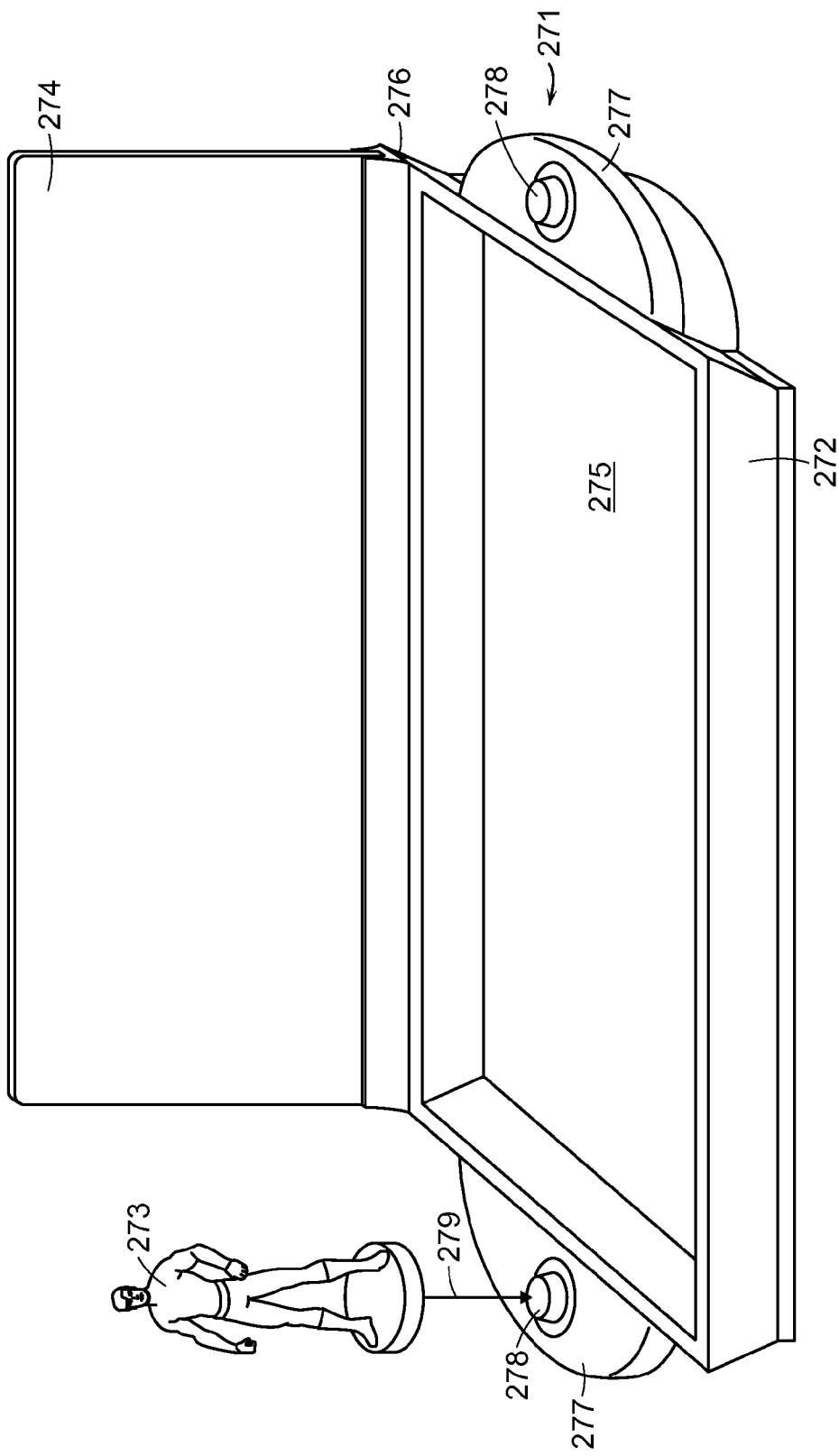
FIG. 10 is a perspective view of a third embodiment of the invention with the figurine being shown above its mounting point.
Figure 11:
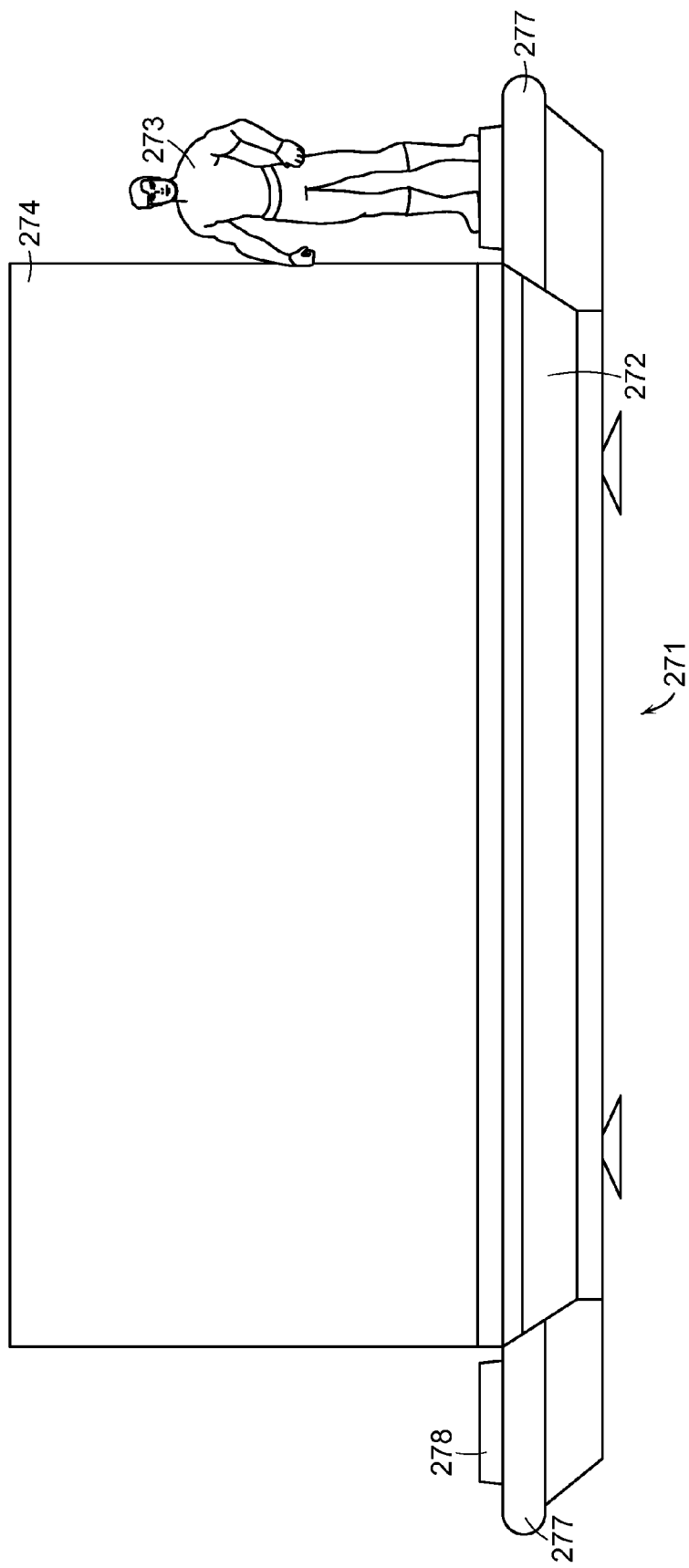
FIG. 11 is a front view of a third embodiment of the invention with the figurine mounted.
Figure 12:
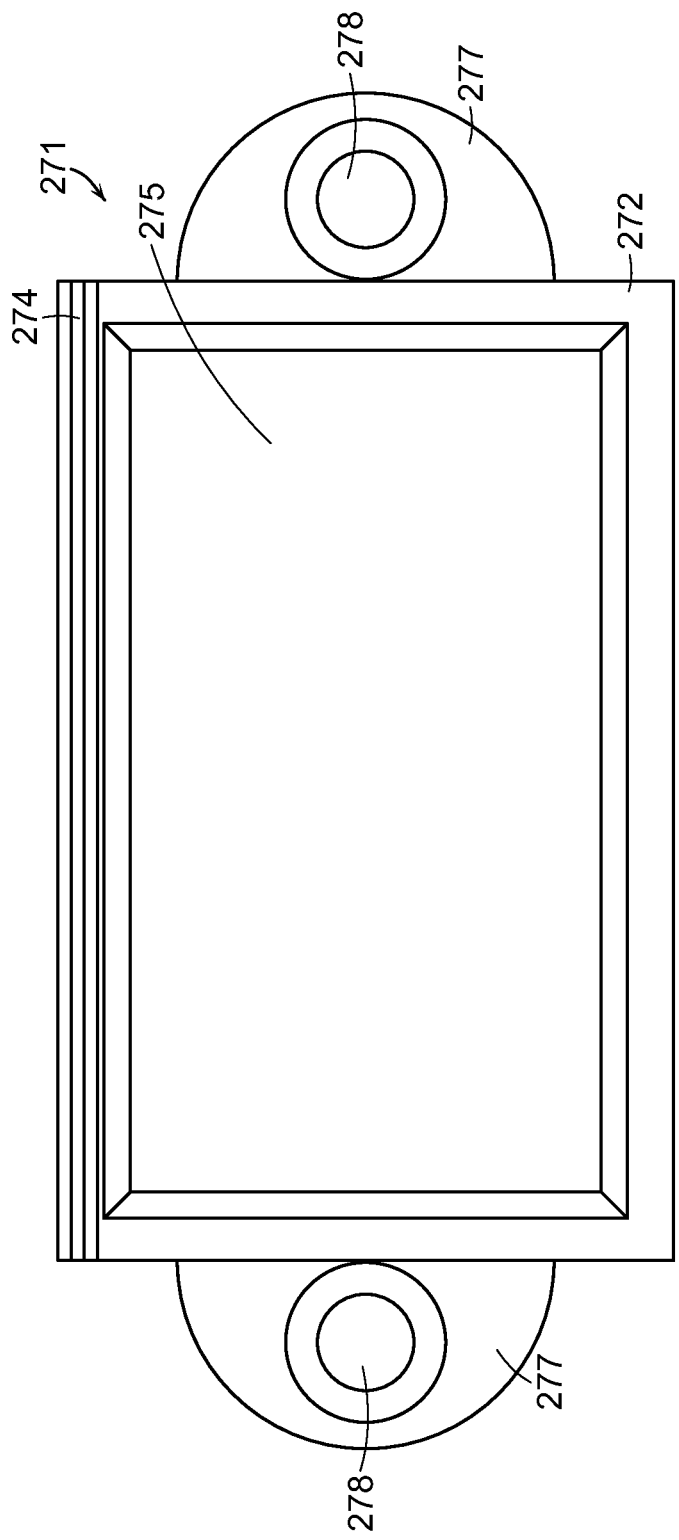
FIG. 12 is a top view of a third embodiment of the invention without the figurine.
Figure 13:
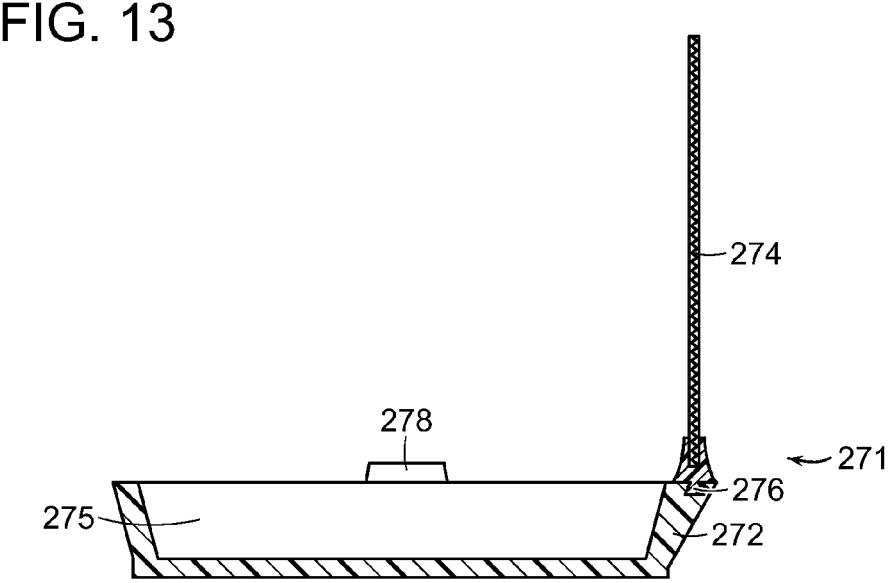
FIG. 13 is a side sectioned view of a third embodiment of the invention without the figurine.

The sides of the outer bowl 12 have a translucent exterior 31 and a solid interior 32. The translucent exterior 31 has the appearance of stacked rings, with each ring preferably being a different color. The translucent exterior 31 also preferably has a hexagon pattern molded into its interior surface to maximize the effect of the integrated lights. FIG. 2 is a perspective view of the interior surface of the translucent exterior 31, detailing the hexagon pattern. The hexagon pattern is created through a series of recesses 33 on the interior of the outer bowl, leaving raised hexagons 34. The exterior surface of the translucent exterior 31 is preferably smooth.

The solid interior 32 of the sides of the outer bowl contains a series of integrated lights 27 and associated wiring 28 to connect the lights 27 to the controller 21. The integrated lights 27 are preferably LED lights, but any other suitable lighting source may be used. The integrated lights 27 are mounted so that one LED light is mounted behind each hexagon 34 in the hexagon pattern of the translucent exterior 31. Placing each LED light behind a multifaceted surface with a hexagon pattern increases the brilliance and effect of the lights on the bowl's user.

The interior surface of the outer bowl 12 contains a water resistant molded rubber or plastic liner 35 to protect the outer bowl and make it easier to clean. At the top of the solid interior of the outer bowl 32 is a shelf 36 where the removable inner bowl 13 can be placed. The removable inner bowl 13 has a circular upper ring 41 with a shape that corresponds to the shelf 36 molded on the outer bowl 12. The inner bowl 13 also preferably contains two handles 42 molded to the sides of the circular upper ring 41 to allow the bowl 13 to be easily handled. The top ring 37 of the translucent exterior contains recesses 38 that correspond to the handles 42 of the inner bowl 13 to allow the inner bowl to sit flush with the shelf 36. In the preferred embodiment, the inner bowl 13 contains a ridge 43 on the top surface of the circular upper ring that allows a removable cover 44 to be mounted to the bowl 13.

The hollow base 14 preferably has buttons 23-26 with four different functions, which can include but are not limited to a button for music, silly, say and color. While there are four type of buttons in the preferred embodiment, it is appreciated that additional functions can be added or combined within the scope of this invention. On the preferred embodiment, the four buttons are grouped together with four sets of buttons placed around the hollow base to allow a user to press them from any side (for a total of 16 buttons). In the preferred embodiment, the music button 26 plays happy, current and trendy music meant to place the child in a positive mood. The controller 21 can optionally include rewritable storage to allow the music stored on the interactive bowl to be changed. The silly button 25 plays unusual sounds that would be silly and pleasing to a child. These sounds can include laughter, whooshing, boings, xylophones, basses and horns. The say button 24 plays words of encouragement to the child to entice the child to continue eating. The say button 24 plays positive sayings such as: come on, your tummy wants to be happy; you're almost finished; and you'll be the super strong one if you finish all your dinner. The color button 23 actuates the integrated lights 27 and can optionally simultaneously actuate a function of one or more other buttons. In the preferred embodiment, the color button 23 actuates the integrated lights 27 in a rapid random pattern over the entire exterior of the bowl and then in an up and down pattern where each ring is sequentially lit or extinguished. The color button 23 can optionally cycle through a single lighting pattern for each push of the button and can be used to actuate additional lighting patterns not described herein. The purpose of all four buttons 23-26 is to generate sounds and lights that would be pleasing to a child and encourage the child to eat.

As seen in FIGS. 7-9 is an interactive tray 151 with a mounting system for a tablet style computer, using the same principles as the interactive bowl. The elements in the alternative embodiments which are substantially the same as the corresponding elements of the first embodiment described are identified with the same numeral. Elements which are similar (but not necessarily identical) in function are denoted by the same numeral plus 100.

The interactive tray 151 comprises a tray shaped base unit 152 containing function buttons 123-126, integrated speakers 122, an integrated light ring 153, mounting points 154 for a tablet cover and a removable tablet cover 155. The interactive tray 151 also contains a controller (not shown) mounted internally that is similar to the controller used in the interactive bowl. The underside of the base unit 152 contains an access door 115 to allow the internally mounted batteries (not pictured) to be replaced.

The interactive tray 151 is preferably smaller than the size of a tray used on a typical high chair to allow it to be used on the surface of most high chair trays. The interactive tray 151 is also preferably large enough to accommodate a standard tablet style computer beneath the removable tablet cover 155. As there are a range of high chair tray sizes, the interactive tray 151 is scalable and can be produced in multiple sizes. The interactive tray 151 can also be used in other settings, such as by a child in a car seat. The underside of the interactive tray contains suction cups 116 to allow the tray to be mounted to a smooth surface. The tray also optionally includes an adjustable strap 161 that goes around the child using the tray to secure the tray when used on the child's lap or on an uneven surface. The tray can optionally include brackets (not shown) to rigidly mount the tray to a high chair.

The tray contains a handle molded 156 to the base unit 152 that allows it to be transported easily. An optional bag (not pictured) may be used to protect the interactive tray 151 when being transported. When placed in the optional bag, the handle 156 extends through the top of the bag to allow the user to carry the interactive tray 151 and bag using the handle.

The interactive tray contains a working surface 157 within the integrated light ring 153 where food can be placed in bowls or plates. When not being used as an eating surface, the interactive tray 151 also includes a clear removable cover 155. In each corner of the working surface 157 is a recessed opening 154. The clear removable cover 155 is preferably rectangular in shape and slightly smaller than the working surface. At the corners of the removable cover 155 are mounting plugs 158 that are shaped to correspond to the recessed openings 154 in each corner of the working surface 157. The mounting plugs 158 are flexibly mounted to the removable cover 155 using elastic material so that the removable cover is under a slight tension when attached to the working surface. When placed over a tablet style computer 159, the slight tension in the removable cover 155 tends to place a downward force on the tablet computer 159, anchoring it to the working surface 157 and keeping it from sliding on the tray. The clear removable cover 155 is also designed to allow the screen of a tablet style computer 159 to be manipulated by a user when mounted.

The function buttons 123-126 on the interactive tray 151 preferably have the same functions as those used on the interactive bowl. The integrated tray 151 preferably has a music button 126, a silly button 125, a say button 124 and a color button 123. The four buttons 123-126 are repeated on the left and right sides of the tray to make them easier to reach. The tray contains two speakers 122 mounted to the upper surface of the base unit 152. The integrated light ring 153 on the interactive tray 151 is comprised of lights mounted under a translucent ring surrounding the working surface of the tray. The translucent ring preferably contains a hexagon pattern similar to the interactive bowl, but adapted to the specific size of the tray. The integrated light ring 153 contains segments of different colors.

Due to the different design of the integrated lights on the interactive tray as compared to the interactive bowl, the color button 123 actuates lighting sequences that are specifically adapted to the interactive tray. The lighting sequences can include a rapid random pattern where individual lights are illuminated and a second rapid random pattern where all of the lights of a certain color are illuminated. The working surface 157 of the tray can optionally include additional lights that can be actuated by the color button 123.

In FIGS. 10-13 is a game dish 271 designed to make eating more enjoyable for children. The game dish 271 is comprised of a base dish 272, a removable figurine 273 and a removable back panel 274.

The base dish 272 comprises an eating area 275, a mounting track 276 for the removable back panel 274 and two handles 277 with a friction mount 278 designed to accept a corresponding circular opening on the underside of the removable figurine 273 that slides over the friction mount 278. The friction mount 278 is preferably a raised circular area on the handles 277 with a slightly conical cross section. The friction mount 278 allows the removable figurine 273 to be mounted to the base dish 272 by pressing the figurine 273 in the direction 279 towards the friction mount 278. The removable figurine 273 can be removed by pulling in the opposite direction of 279. There is a friction mount 278 on each handle 277. The figurine may be mounted on either friction mount 278 and the open friction mount may optionally be used to mount a second figurine 273 or an additional accessory.

The friction mount 278 is preferably designed to allow a small child to be able to easily remove and mount the figurine 273. The base dish 272 is preferably constructed of a dishwasher safe material, which can include a plastic or tempered glass. The mounting track 276 is located at the rear of the dish located furthest from the user. The mounting track 276 is shaped to correspond to the base of the removable back panel 274 to allow a removable back panel to be easily attached and removed.

The removable back panel 274 contains an image that is related to the figurine 273. The image and figurine 273 can be from a popular motion picture, television series, or a set of characters designed specifically for the game dish. The back panel 274 contains an image that is related to the figurine 273, which can include a location where the figurine is associated or images of characters that the figurine interacts with. While the back panel 274 and figurine 273 are intended to be related, they are removable and a child could mix and match back panels and figurines that are unrelated if the child so wishes.

The removable back panel 274 and removable figurine 273 allow a child to feel more included in the meal experience and they therefore encourage the child to eat. It is contemplated that a child would have more than one set of figurines and back panels so that a parent could ask the child which theme he or she would prefer for a specific meal.

To involve a child in the selection of the game dish 271 theme for a specific meal, a parent would first ask the child which theme he or she wanted for the meal. A theme could include a back panel 274 and removable figurine 273 from a recent children's movie or cartoon. Based on the child's request, the parent would then build the dish by sliding in the back panel 274 and mounting the removable figurine 273 to the base dish 272. Once the parent completed building the dish, it would be ready for the child to use for eating and/or playing.

Figure 14:
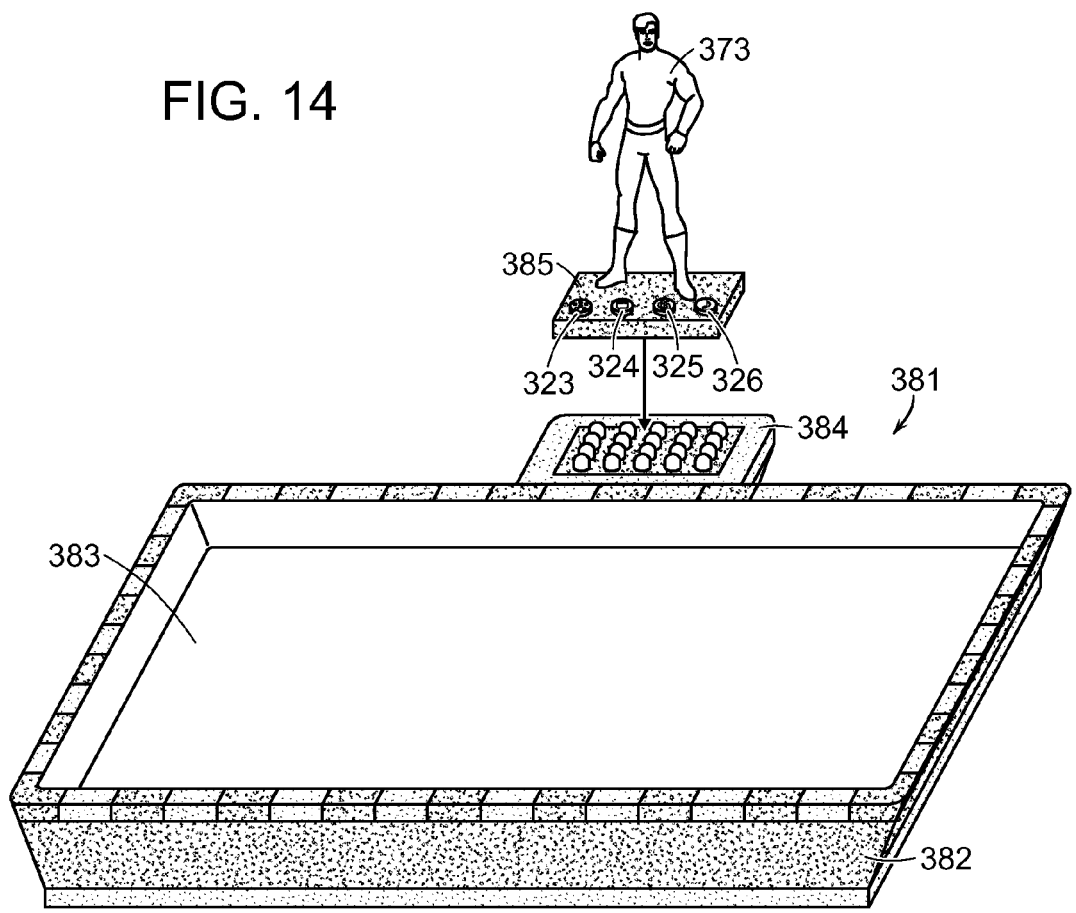
FIG. 14 is a perspective view of a fourth embodiment of the invention with the figurine being shown above its mounting point.

In FIGS. 14-16 is a toy tower dish 381 designed to make eating more enjoyable for younger children. The toy tower dish 381 comprises a base dish 382 and a removable figurine 373 with buttons 323-326 actuating integrated lights and an integrated speaker.

The base dish 382 comprises an eating area 383 and a mounting area 384 for the removable figurine 373 at the rear of the dish furthest from the user. The base dish 382 is preferably constructed of a dishwasher safe material, which can include a plastic or tempered glass. The base dish 382 also contains suction cups 316 to allow the toy tower dish 381 to be temporarily and positively mounted to a smooth surface. The mounting area 384 preferably contains an area of raised circular areas with a slightly conical cross section. The base 385 of the figurine 373 contains corresponding circular openings that slide over the friction mount. The friction mount is preferably designed to allow an adult to remove and mount the figurine 373. A locking mechanism with a release button can optionally be included to securely mount the figurine 373 to the mounting area 384.

The removable figurine 373 contains four buttons 323-326 in its base 385 with similar functions to the interactive bowl. Mounted on the top of the base 385 is a music button 326, a silly button 325, a say button 324 and a color button 323. The removable figurine 373 contains an integrated speaker (not shown) in the base 385 and integrated lights specifically designed for each style of figurine. Depending on the specific figurine, integrated lights can be added to the figurine's eyes or clothing to appeal to a child. The various lighting sequences actuated by the color button 323 would depend on the style and number of lights integrated in the figurine. There can optionally be additional lights included around the base 385 for additional lighting brilliance.

What has been described is an apparatus for encouraging children to eat meals and a method of using the same. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An apparatus for holding food comprising:
   a bowl with an inner surface, an outer surface, a top rim and fixed to a base that defines a compartment;
   a controller mounted within said compartment;
   one or more lights fixed to the outer surface of said bowl;
   one or more buttons capable of actuating a function fixed to the base;
   one or more audio speakers mounted to said base;
   where said controller is electrically connected to said light(s), button(s) and audio speaker(s);
   wherein said controller is capable of storing audio and lighting sequence data;
   a translucent layer mounted over the outer surface of said bowl where one or more said lights are situated between the outer surface of said bowl and the translucent layer, where the side of said translucent layer facing the outer surface of said bowl further comprises a multitude of recesses, leaving raised portions substantially in the shape of a hexagon.

2. The apparatus of claim 1 wherein said lights are mounted in parallel rings about the outer surface of said bowl oriented so that each ring is parallel to a surface where said apparatus is placed.

3. The apparatus of claim 2 further comprising an inner bowl with a top rim removably mounted to the inner surface of said bowl, wherein said inner bowl further comprises extrusions substantially parallel to the surface where said apparatus is placed and extending from the top rim.

4. An apparatus for entertaining children comprising:
   a tray with a top surface and a bottom surface;
   a substantially flat area on said top surface with multiple lights fixed to the top surface about the perimeter of the substantially flat area;
   one or more buttons capable of actuating a function mounted to the top surface of said tray;
   one or more audio speakers mounted to said tray;
   a controller mounted internally;
   where said controller is electrically connected to said lights, button(s) and audio speaker(s); and
   a translucent layer mounted over said multiple lights, where the side of said translucent layer facing said multiple lights further comprises a multitude of recesses, leaving raised portions substantially in the shape of a hexagon.

5. The apparatus of claim 4 wherein said controller is capable of storing audio and lighting sequence data where said audio data further comprises voice recordings and said lighting sequence data further comprises a random rapid pattern.

6. An apparatus for entertaining children comprising:
   a tray with a raised edge about a substantially flat top surface;
   a first extrusion extending from a portion of the raised edge of said tray with one or more raised circular sections extending from the top surface of said extrusion;
   a toy figurine with a base comprising a top surface and a bottom surface, where said toy figurine is fixed to the top surface of said base and the bottom surface of said base contains recessed circular openings capable of interacting with said raised circular sections to provide a removable friction mount; and
   a panel removably mounted to a raised edge of said tray and with a planar direction oriented in a direction substantially normal to the substantially flat top surface.

7. The apparatus of claim 6 further comprising a second extrusion extending from another portion of the raised edge of said tray and substantially similar to said first extrusion.

8. The apparatus of claim 7, wherein said removable panel is substantially flat with a track fixed on one edge that removably locks into a corresponding track mounted on a raised edge of said tray.

9. The apparatus of claim 6 wherein said figurine with a base further comprises:
   one or more buttons capable of actuating a function mounted to the top surface of said base;
   one or more lights mounted to said figurine;
   one or more audio speakers integrated in said base; and
   where said light(s), button(s) and audio speaker(s) are electrically connected.

10. The apparatus of claim 9 further comprising lights fixed to the raised edge along the perimeter of said tray and electrically connected to said button(s).

11. The apparatus of claim 10 wherein said controller is capable of storing audio and lighting sequence data where said audio data further comprises voice recordings and said lighting sequence data further comprises a random rapid pattern.

12. The apparatus of claim 4 further comprising a flexible transparent cover removably attached to said substantially flat surface using an elastic material for providing downward tension so that said cover provides a downward force on objects placed between said cover and said substantially flat surface.

13. The apparatus of claim 1, wherein one or more lights fixed to the outer surface of said bowl are positioned behind a raised portion of the translucent layer that is substantially in the shape of a hexagon.

14. The apparatus of claim 1 further comprising a water resistant liner contoured and fixed to the inner surface of said bowl.

15. The apparatus of claim 3 wherein said translucent layer is further comprised of a plurality of vertically stacked segments that are a substantially equal distance radially from said lights mounted in parallel rings about the outer surface of said bowl so that each segment is parallel to a surface where said apparatus is placed, where each segment is connected to an adjacent segment; and
   where the top vertically stacked segment further comprises recesses corresponding to said extrusions extending from said inner bowl.

* * * * *